United States Patent [19]

Beattie

[11] Patent Number: 4,838,021

[45] Date of Patent: Jun. 13, 1989

[54] ELECTROSTATIC ION THRUSTER WITH IMPROVED THRUST MODULATION

[75] Inventor: John R. Beattie, Westlake Village, Calif.

[73] Assignee: Hughes Aircraft Company, Los Angeles, Calif.

[21] Appl. No.: 131,978

[22] Filed: Dec. 11, 1987

[51] Int. Cl.[4] .......... F02C 1/00

[52] U.S. Cl. .......... 60/202; 60/204; 315/111.81

[58] Field of Search .......... 60/202, 204; 313/359.1, 313/360.1, 361.1, 362.1; 315/111.81, 111.91

[56] References Cited

U.S. PATENT DOCUMENTS

| | | | |
|---|---|---|---|
| 3,279,176 | 10/1966 | Boden | 313/361.1 |
| 3,952,228 | 4/1976 | Reader et al. | 60/202 |
| 4,318,028 | 3/1982 | Perel et al. | 315/111.81 |
| 4,454,453 | 6/1984 | Sagawara | 315/111.81 |

*Primary Examiner*—Louis J. Casaregola
*Attorney, Agent, or Firm*—Wanda K. Denson-Low; V. G. Laslo; A. W. Karambelas

[57] ABSTRACT

An ion propulsion system is disclosed. The invention includes a ionizing system for ionizing a gaseous propellant within a chamber to produce a plasma. The ionizing system includes a cathode 14 to provide a source of electrons and anodes 11 and 13 to accelerate the electrons to velocitites sufficient to ionize the gaseous propellant. The invention further includes an ion extraction system 20 for expelling an ion beam from the plasma. A particularly novel aspect of the invention is the provision of a control system 45 and 46 for modulating the current of the ion beam by modulating the current through the anode 11 and 13.

6 Claims, 4 Drawing Sheets

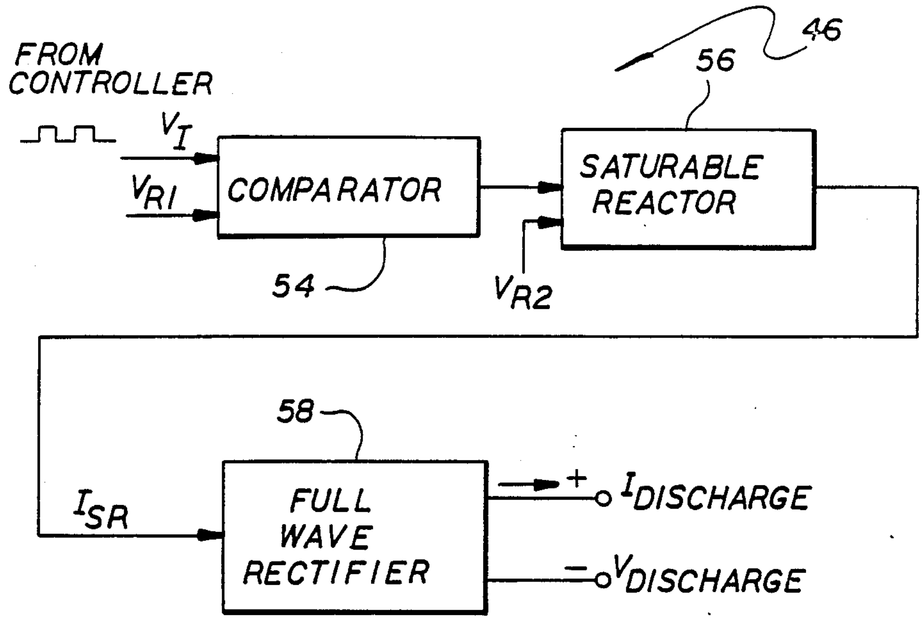
FIG. 3
FIG. 4
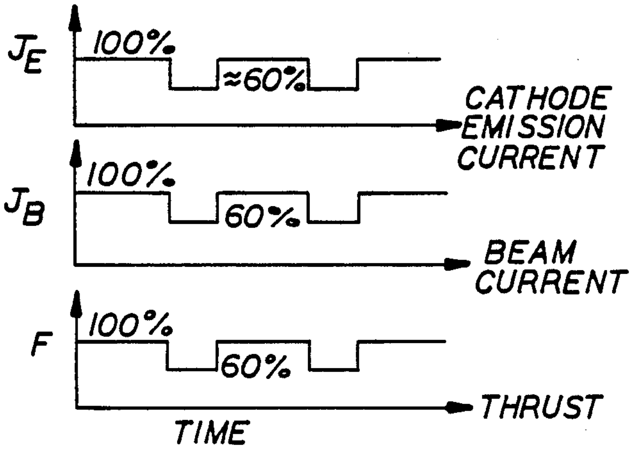

ELECTROSTATIC ION THRUSTER WITH IMPROVED THRUST MODULATION

BACKGROUND OF THE INVENTION

1. Field of the Invention:

The present invention relates to spacecraft propulsion. More specifically, the present invention relates to electrostatic ion thrusters for use on a spinning spacecraft.

While the present invention is described herein with reference to a particular embodiment for an illustrative application, it is understood that the invention is not limited thereto. Those having ordinary skill in the art and access to the teaching provided herein will recognize additional modifications, applications and embodiments within the scope thereof.

2. Description of the Related Art:

Although chemical thrusters are widely used for the propulsion of planetary or orbital spacecraft, an alternative technique of electrostatic ion propulsion is well known in the art. U.S. Pat. No. 3,052,088 to Davis et al and U.S. Pat. No. 3,156,090 to Kaufman describe typical electrostatic ion propulsion devices. Electrostatic ion thrusters have a high specific impulse provide equivalent thrust with generally less propellant than that required by chemical thrusters. This results in generally longer maneuver life. Since maneuver life is a significant limiting factor on the mission life of a satellite, it would be advantageous to employ electrostatic ion thrusters in orbital satellites.

It is known, however, that the use of an electrostatic ion thruster for station keeping on the spinning portion of a spin-stabilized spacecraft requires some thrust modulation to maintain spacecraft attitude. That is, when the center of mass of the system is offset relative to the spin axis, the ion thruster will produce a torque about the center of mass. The thrust may be modulated over a specified portion of the spacecraft revolution, to produce an offsetting torque sufficient to maintain a desired spacecraft attitude. This thrust modulation eliminates the need to use chemical thrusters to offset the undesirable torque and maintains the advantage of the ion thruster (viz. high specific impulse) while mitigating the risk of chemical-exhaust contamination.

In addition, modulated ion propulsion offers significant performance, lifetime and cost advantages over chemical thrusters. The ability to realize these advantages is dependent on the ability to modulate thrust without reducing the lifetime of the ion propulsion system or its compatibility with the spacecraft.

One prior ion thrust modulation technique achieved thrust modulation by modulating the output voltages of screen and accelerator power supplies used to form an exhaust beam. With this technique, ion beam current is essentially maintained constant while the energy transferred to the ions from the screen electrode is reduced. This reduction in energy results in a slowing of the ions which causes a defocusing of the ion beamlets path. The defocusing of the ion beamlets results in increased ion impingement on the electrodes. Increased ion impingement coupled with the increased negative voltage of the accelerator electrode during modulation contribute to an increased electrode wear rate, an additional limiting factor on spacecraft mission life.

An additional disadvantage of the sputtering caused by the slowing of the ions is that the sputtered material may contaminate sensitive spacecraft surfaces.

Further, during operation of an ion thruster, it is often desirable to modulate down to 60 percent or less of the nominal thrust. At such low levels of thrust, the impingement of ions onto the electrodes by the modulated ion thrusters of the prior art may be so great that the wear on the electrodes is magnified many times. This problem could be partially offset by modulating to a higher percentage of the nominal thrust. However, this would require the period of modulation to be extended in order to provide the desired offsetting torque. As a result, the thruster must be activated for a longer period of time in order to complete the desired station keeping maneuver. This longer duration of duty cycle also reduces mission life.

In addition, conventional systems typically require a three-grid ion extraction assembly in order to achieve sufficient thrust modulation. Such an assembly is typically heavy, costly and difficult to assemble.

There is therefore a recognized need in the art for a lightweight, low cost, long life ion thruster which offers thrust modulation without a reduction in the exit velocity of propellant ions.

SUMMARY

The shortcomings of the related art are substantially addressed by the electrostatic ion thruster of the present invention. The invention offers high performance, low cost and long life operation by providing thrust modulation without reducing the exit velocity of the propellant ions. The invention includes an ionizing means for ionizing a gaseous propellant within a chamber to produce a plasma. The ionizing means includes a cathode to provide a source of electrons and an anode to accelerate the electrons to velocities sufficient to ionize the gaseous propellant. The invention further includes an ion extraction system for expelling an ion beam from the plasma. A particularly novel aspect of the invention is the provision of a control means for modulating the current of the ion beam by modulating the current through the anode.

BRIEF DESCRIPTION OF THE DRAWINGS

FIG. 3 is a block diagram of the discharge power supply of the present invention.

FIG. 4 illustrates the direct correlation between cathode emission current, ion beam current and thrust as provided by the present invention.

DESCRIPTION OF THE INVENTION

Figure 1:
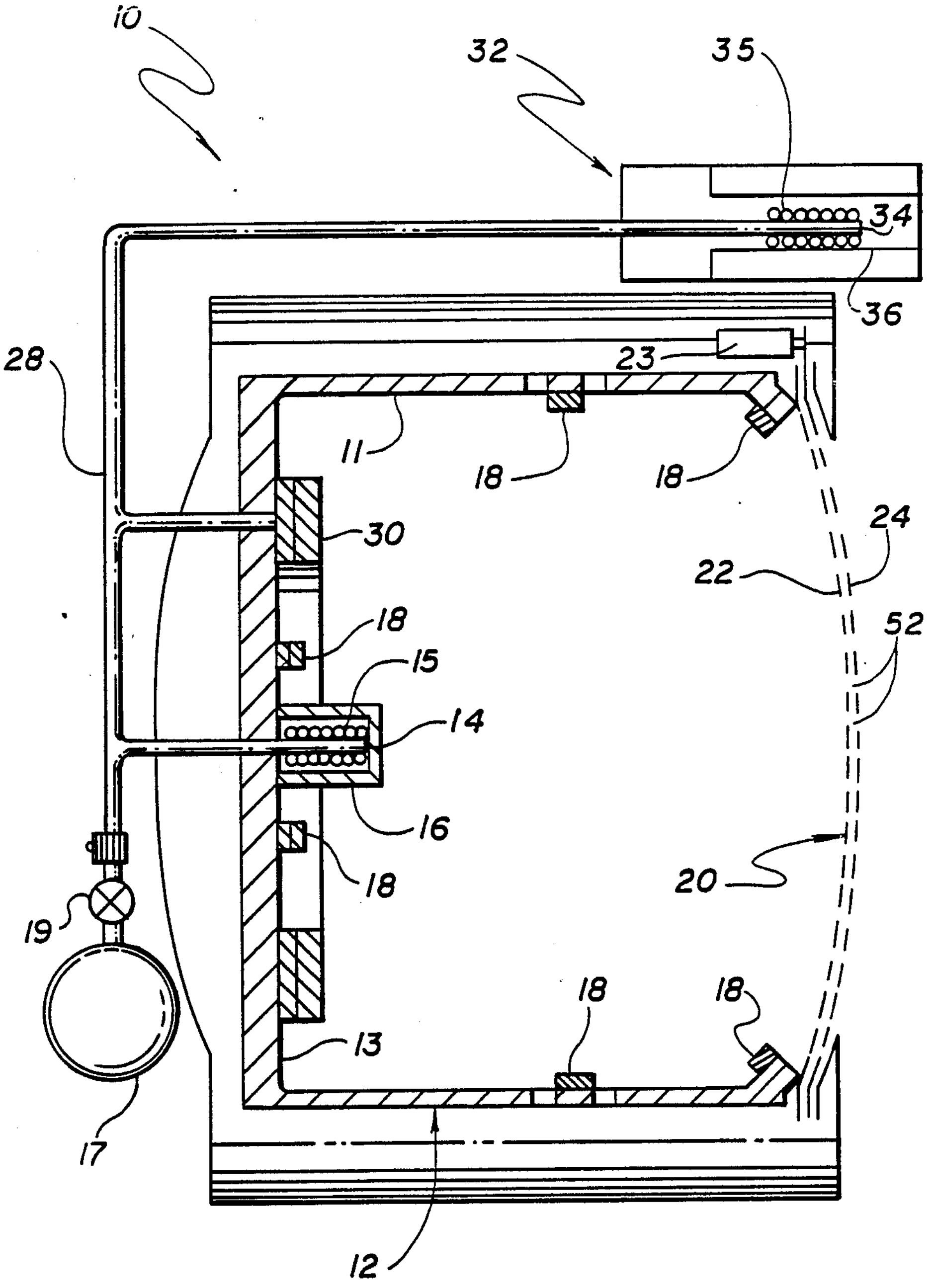
FIG. 1 shows the electrostatic ion thruster of the present invention in a cross sectional view.

Referring now to the drawings, FIG. 1 shows an illustrative cross section of a conventional ion thruster 10. The thruster 10 includes an ionization chamber 12. The ionization chamber 12 is formed by a cylindrical metallic conductive sidewall 11 and a conductive endwall 13. The chamber sidewall 11 and endwall 13 also function as an anode to which electrons from a cathode 14 are accelerated. The cathode 14 is a metal tube located within the ionization chamber 12. The cathode 14 is attached to a reservoir 17 of low-work-function material such as barium oxide BaO. A propellant gas, xenon for example, is provided from the reservoir 17 to the ionization chamber 12. The propellant gas passes from the reservoir 17 through a standard solenoid operated valve 19, which is set per mission requirements, through a gas manifold 28 and enters the ionization chamber 12 through a plenum 30. A small portion of the propellant is passed through the cathode 14 in order to draw out free electrons. A cathode heater 15 surrounds the cathode 14. When the cathode 14 is heated by the cathode heater 15, the cathode 14 is stimulated to emit electrons. A cathode keeper 16 surrounds the cathode heater 15 and is positively charged with respect to the cathode 14 thus drawing electrons out of the cathode 14. The cathode keeper 16 is a cylinder of metal or other suitably conductive material with an opening at the end opposite the cathode 14 through which electrons emitted from the cathode 14 are drawn out.

An arrangement of magnets 18 surrounds portions of the ionization chamber 12. The magnets 18 may be permanent or electromagnetic as is known in the art. The magnetic field produced by the magnets 18 contains the electrons produced by the cathode 14 within the ionization chamber 12. Thus, the ionization chamber 12 is adapted to contain a plasma of gas molecules and ions created by the collision of electrons, emitted by the cathode 14, with the gas within the chamber 12.

An ion extraction assembly 20 is located at the opposite end of the ionization chamber 12 from the chamber endwall 13 and the cathode 14. The ion extraction assembly 20 expels ions contained in the plasma from the chamber 12 at high velocity thereby creating a positive ion beam and producing thrust. The ion extraction assembly 20 includes a screen electrode 22 which is positively charged with respect to spacecraft ground and an accelerator electrode 24 which is negatively charged with respect to the accelerator screen electrode 22. The negative charge on accelerator electrode 24 is supplied by the electrical connector 23. Both the screen electrode 22 and the accelerator electrode 24 are made of steel or other suitably rigid, conductive material. A plurality of holes 52 are provided in the electrodes 22 and 24 to allow the propellant ions to be expelled from the thruster 10.

A neutralizer assembly 32 is positioned near the ionization chamber 12. The neutralizer assembly 32 emits electrons to compensate for the flow of positive ions from the spacecraft and to neutralize the space charge of the positive ion beam. This operates to maintain the spacecraft at a neutral potential. The neutralizer assembly 32 includes a neutralizer cathode 34 to provide electrons, a second cathode heater 35 which stimulates the emission of electrons from the neutralizer cathode 34, and a neutralizer keeper 36 which draws the electrons from the cathode 34. A small portion of the propellant is passed through the neutralizer cathode 34 from the gas manifold 28 to force the electrons out from the neutralizer assembly 32.

Figure 2:
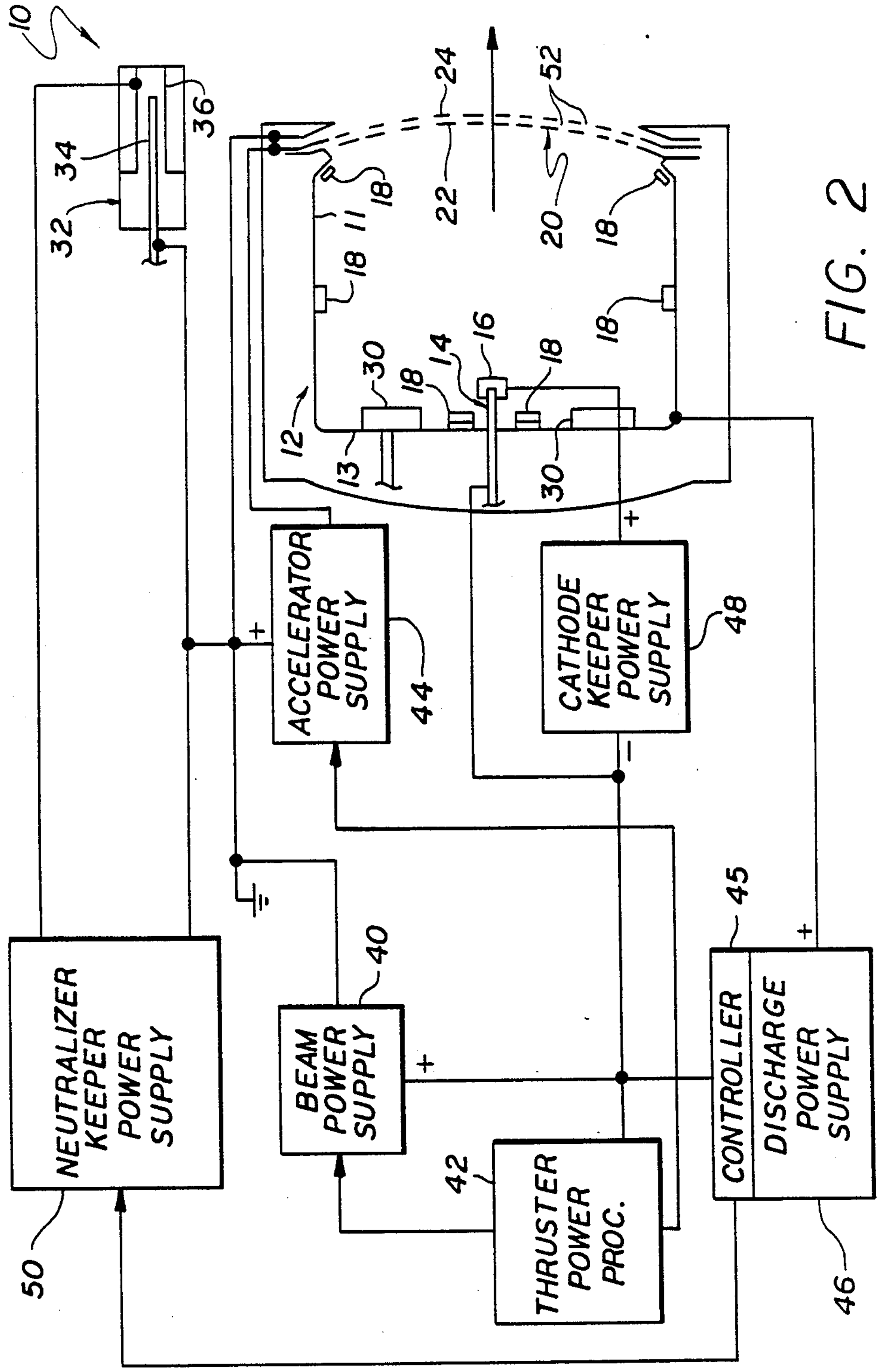
FIG. 2 shows the electrical connections for the ion thruster of the present invention..

FIG. 2 is a schematic representation of the ion thruster 10 in a diagrammatic representation of the power and control circuitry of the present invention. A beam power supply 40 is connected between ground and the cathode 14. The output voltage of the beam power supply 40 is variable and is controlled by a conventional thruster power processor 42 according to mission requirements. A conventional accelerator power supply 44 is connected between ground and the accelerator electrode 24 to provide a negative voltage to the accelerator electrode 24 with respect to spacecraft ground. The output voltage of the accelerator power supply 44 is also variable and is controlled by the thruster power processor 42.

A conventional discharge power supply 46, modified in accordance with the present invention to respond to a controller 45, is coupled between the positive side of the beam power supply 40 and the anodes of the ion thruster provided by the sidewall 11 and the endwall 13 of the ionization chamber 12. The discharge power supply 46 provides a potential difference between the cathode 14 and the anode 11 and 13. The current of the discharge power supply 46 is controlled by the controller 45.

A conventional cathode keeper power supply 48 is coupled between the cathode 14 and the cathode keeper 16 to supply the cathode keeper 16 with positive potential with respect to the cathode 14. A neutralizer power supply 50 supplies a voltage difference between the neutralizer cathode 34 and the neutralizer keeper 36. The neutralizer cathode 34 is coupled to ground. The controller 45 also controls the neutralizer keeper power supply 50. Conventional heater supplies (not shown) are provided for both the cathode 14 and the neutralizer cathode 34.

Signals from controller 45 may be provided by an onboard microprocessor or from a ground station as is known in the art. The control signals provided thereby are effective to initiate and regulate thrust.

FIG. 3 shows a block diagram of the discharge power supply 46. A comparator 54 receives a signal from the controller 45 and compares the signal to a reference voltage. The comparator output signal is connected to a saturable reactor 56 along with a second reference voltage. As is known in the art, a saturable reactor can be used to convert a variable voltage input to a variable current output. The saturable reactor 56 provides a current which is regulated according to the signal from the controller 45. The saturable reactor 56 is connected to a full wave rectifier 58 in order to obtain a positive, variable current output. Those skilled in the art will recognize that any current regulated power source could be used within the scope of the invention.

A signal from the controller 45 initiates operation of the thruster 10 by activating the thruster power processor 42 which in turn activates the power supplies 40, 44, 46 48, 50 and the heater power supplies (not shown). In addition, the power processor 42 opens the solenoid valve 19 via connections not shown. Current flows through the cathode heaters 15 and 35 from the heater power supplies to initiate electron emission from the cathodes 14 and 34. A voltage is applied to the cathode keeper 16 and neutralizer cathode keeper 36 by the cathode keeper power supply 48 and neutralizer keeper power supply 50 in order to draw electrons from the cathodes 14 and 34. Propellant gas is then allowed to flow from the reservoir 17, through the valve 19 via the manifold 28 through the plenum 30 into the ionization chamber 12. The manifold 28 passes a small amount of the gas through the cathode 14 and the neutralizer assembly 32. The flow of gas through the cathode 14 sweeps the electrons out through a cathode orifice into the ionization chamber 12. The electrons are accelerated to the sidewall and the endwall 13 by the potential difference between the ionization chamber 12 and the cathode 14 generated by the discharge power supply 46. Collisions between the electrons and the propellant in the ionization chamber 12 cause ionization of the propellant and creation of the plasma. The concentration of ions in the ionization chamber 12 may be approximately 10 to 15% of the total particle population. The electrons are contained within the ionization chamber 12 by a magnetic field produced by the magnets 18 attached to the sidewall 11 and endwall 13. A discharge plasma of electrons and gas ions is thereby created within the ionization chamber 12.

The ion extraction assembly 20 accelerates the positively charged ions past the screen grid 22 and the negatively charged accelerator grid 24 by the electric field between the two grids. Each grid has a plurality of holes 52 which are aligned to pass the ions into space with a minimum of divergence and impingement on the grids. Thrust is developed by the beam of ions accelerated through the ion extraction assembly 20. The beam of positively charged ions is made neutral by a stream of electrons from the neutralizer assembly 32.

A spacecraft in orbit experiences a number of forces disturbing its orbit. The drift of the spacecraft may be corrected by properly timed firings of the thruster at the appropriate orbital node. In prior systems such as that disclosed in an application entitled *Spacecraft With Modulated Thrust Electrostatic Ion Thrusters And Associated Method*, Ser. No. 07/041,564, filed Apr. 23, 1987, an off axis thruster may be off-pulsed at the appropriate time in order to achieve a thrust directed through the center of mass of the spacecraft or to provide attitude correction. Off-pulsing is the process of shutting off or reducing the thrust of a thruster during a specified period of the total revolution. However, off-pulsing of the electrostatic ion thrusters of the prior art caused a decrease in the life of that thruster.

The present invention provides thrust modulation for electrostatic ion thrusters by modulating the thrust level F between two non-zero levels. This is accomplished by modulating the cathode emission current $J_E$ as shown in FIG. 4. The modulation of cathode emission current is accomplished by modulating the current of the discharge power supply 46. The modulation of cathode emission current modifies the concentration of ions within the ionization chamber 12. The change in the concentration of ions within the ionization chamber 12 effectively changes the ion beam current $J_B$ through the ion extraction assembly 20 which, in turn, changes the thrust level of the ion thruster 10.

Figure 5:
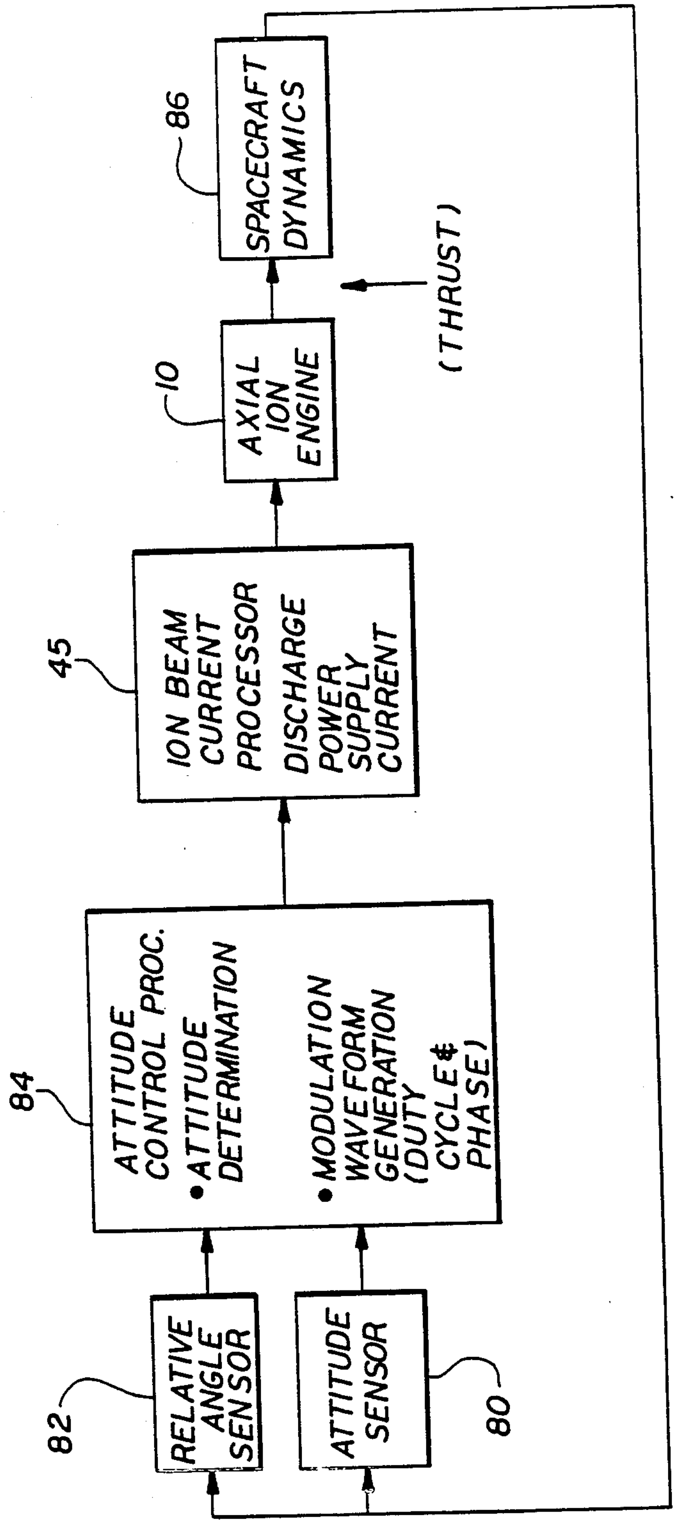
FIG. 5 is an operational block diagram of an attitude control system in accordance with the present invention.

FIG. 5 shows an operational block diagram of a conventional attitude control system. A relative angle sensor 82 senses the position of the spinning rotor of the spacecraft relative to its despun platform. An attitude sensor 80 senses the spacecraft attitude. This information is input to an attitude control processor 84 which determines the current spacecraft attitude and generates the desired modulation waveform to achieve the desired attitude. The modulation waveform is input to the controller 45 which modulates thrust in the manner described above to accomplish the desired attitude correction maneuver.

While the present invention has been described herein with reference to an illustrative embodiment and a particular application, it is understood that the invention is not limited thereto. Those having ordinary skill in the art and access to the teachings of the present invention will recognize additional modifications, application and embodiments within the scope thereof. For example, the ion extraction assembly 20 of the thruster 10 could include a deceleration electrode without departing from the scope of the invention.

Thus, it is intended by the appended claims to cover any and all such modifications, applications and embodiments within the scope of the invention.

Accordingly, what is claimed is:

1. An electrostatic ion thruster with improved thrust modulation comprising:
- means for ionizing a gaseous propellant within a chamber to produce a plasma, said ionizing means including:
- cathode means for providing electrons; and
- anode means for accelerating said electrons to ionize said gaseous propellant;
- ion extraction means for extracting an ion beam from said plasma; and
- control means for modulating the current of said ion beam by modulating the current through said anode means to change the concentration of ions in said chamber.

2. The ion thruster of claim 1 wherein said control means includes:
- discharge power supply means for polarizing said anode means such that said control means modulares said current of said ion beam by modulating the current of said discharge power supply means; and
- a controller connected to said discharge power supply for providing a signal to said discharge power supply corresponding to the level of thrust desired.

3. The ion thruster of claim 2 wherein said discharge power supply means includes:
- comparator means for comparing the input voltage from said controller with a reference voltage to produce a control voltage;
- saturable reactor means for processing a reference voltage and said control voltage to create a variable current output; and
- full wave rectifier means to convert said variable current output to a variable positive current.

4. An electrostatic ion thruster with improved thrust modulation comprising:
- ionizing means for ionizing a gaseous propellant to produce a plasma, said ionizing means including:
  - cathode means for providing electrons; and
  - anode means for accelerating said electrons to energies sufficient to ionize said gaseous propellant;
- ion extraction means for expelling an ion beam from said plasma; and
- control means for modulating the current of said ion beam, said control means including:
  - discharge power supply means for polarizing said anode means such that said control means modulates the current of said ion beam by modulating the current of said discharge power supply means; and
  - a controller connected to said discharge power supply for providing a signal to said discharge power supply corresponding to the level of thrust desired.

5. The ion thruster of claim 4 wherein said discharge power supply means includes:
- comparator means for comparing the input voltage from said controller with a reference voltage to produce a control voltage;
- saturable reactor means for processing a reference voltage and said control voltage to create a variable current output;

full wave rectifier means to convert said variable current output to a variable, always positive current.

6. A method for modulating the thrust of an electrostatic ion thruster including an ionizing assembly having a cathode means and an anode means, said method comprising the steps of:

(a) providing a gaseous propellant within a chamber;
(b) ionizinf said gaseous propellant to produce a plasma;
(c) expelling a beam of ions from said plasama; modulating the current through the anode of said ionizing assembly to change the concentration of ions in said chamber.

* * * * *